(12) United States Patent
Bang et al.

(10) Patent No.: US 9,247,549 B2
(45) Date of Patent: Jan. 26, 2016

(54) APPARATUS AND METHOD FOR SHF/EHF BAND WIRELESS TRANSMISSION ON MULTI-LEVEL CELL CONFIGURATION

(71) Applicant: Electronics and Telecommunications Research Institute, Daejeon (KR)

(72) Inventors: Seung Chan Bang, Daejeon (KR); Pyeong Jung Song, Daejeon (KR); Hyeong Jun Park, Daejeon (KR); Tae Joong Kim, Gyeonggi-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 206 days.

(21) Appl. No.: 13/750,416

(22) Filed: Jan. 25, 2013

(65) Prior Publication Data

US 2013/0231150 A1 Sep. 5, 2013

(30) Foreign Application Priority Data

Jan. 25, 2012 (KR) .................. 10-2012-0007157
Jan. 24, 2013 (KR) .................. 10-2013-0007754

(51) Int. Cl.
*H04B 7/00* (2006.01)
*H04W 72/08* (2009.01)
*H04W 40/22* (2009.01)
*H04W 72/12* (2009.01)

(52) U.S. Cl.
CPC .............. *H04W 72/08* (2013.01); *H04W 40/22* (2013.01); *H04W 72/12* (2013.01)

(58) Field of Classification Search
None
See application file for complete search history.

(56) References Cited

U.S. PATENT DOCUMENTS

| 2007/0171818 A1* | 7/2007 | Shoji et al. .................... 370/229 |
| 2010/0238826 A1 | 9/2010 | Borran et al. |
| 2011/0182174 A1* | 7/2011 | Pi et al. ......................... 370/229 |
| 2013/0155847 A1* | 6/2013 | Li et al. ......................... 370/225 |
| 2014/0321282 A1* | 10/2014 | Pragada et al. ............... 370/235 |

FOREIGN PATENT DOCUMENTS

| KR | 2001-0087367 | 9/2001 |
| KR | 10-1075964 | 10/2011 |

OTHER PUBLICATIONS

Hiruta, Masato et al., "A Study on Optical Wireless Train Communication System using Mobile Object Tracking Technique," ICACT 2009, 11th International Conference on Advanced Communication Technology, vol. 1:35-40 (2009).

* cited by examiner

*Primary Examiner* — Edward Urban
*Assistant Examiner* — Mohammed Rachedine
(74) *Attorney, Agent, or Firm* — Nelson Mullins Riley & Scarborough LLP; Anthony A. Laurentano; Lewis Lee (57) ABSTRACT

Provided is an apparatus for super high frequency (SHF)/extremely high frequency (EHF) band wireless transmission on a multi-level configuration. The apparatus may include a list managing unit to receive and manage a first list associated with an SHF/EHF band signal from a terminal connected to a wireless network, a path finding unit to select a path having a communication quality value greater than or equal to a first threshold value by referring to the first list, and a scheduling unit to schedule available SHF/EHF band radio resources for the selected path.

14 Claims, 8 Drawing Sheets

APPARATUS AND METHOD FOR SHF/EHF BAND WIRELESS TRANSMISSION ON MULTI-LEVEL CELL CONFIGURATION

CROSS-REFERENCE TO RELATED APPLICATION

This application claims the priority benefits of Korean Patent Application No. 10-2012-0007157, filed on Jan. 25, 2012, and Korean Patent Application No. 10-2013-0007754, filed on Jan. 24, 2013, in the Korean Intellectual Property Office, the disclosure of which is incorporated herein by reference.

BACKGROUND

1. Field of the Invention

Exemplary embodiments relate to a super high frequency (SHF)/extremely high frequency (EHF) band wireless transmission technology, and more particularly, to an apparatus and method that may resolve line of sight (LoS) limitations found in super high frequency (SHF)/extremely high frequency (EHF) band transmissions, by introducing the concepts of a multi-level relay topology and separation of control and traffic resource allocation.

2. Description of the Related Art

With an increase in an amount of mobile traffic, cell minimization has been pursued. A reduction of a cell radius causes inter-cell interference more often and results in more frequent handover, which may increase a system load, and in some instances, may raise a serious issue of a handover delay beyond an allowable limit.

Accordingly, there is a limitation on architectures using only cellular frequency bands, and in terms of development of new frequency resources, exploitation of super high frequency (SHF)/extremely high frequency (EHF) bands is being contemplated.

In a case of SHF/EHF bands, implementation is possible with a millimeter wave (mmWave) band-based narrow beam, so that interference and handover issues are alleviated to a great extent and cell micro-minimization is achieved. However, one of the unique properties of SHF/EHF bands, line of sight (LoS) communication, is also a limitation issue to be resolved.

SUMMARY

According to an aspect of the present invention, there is provided an apparatus for super high frequency (SHF)/extremely high frequency (EHF) band wireless transmission on a multi-level configuration, the apparatus including a list managing unit to receive and manage a first list associated with an SHF/EHF band signal from a terminal connected to a wireless network, a path finding unit to select a path having a communication quality value greater than or equal to a first threshold value by referring to the first list, and a scheduling unit to schedule available SHF/EHF band radio resources for the selected path.

The wireless network may include a first network performing a central role, and a second network performing at least one task of configuring, maintaining, and unconfiguring a network with the restricted support of the first network.

The first list may include at least one piece of information among information associated with a base station neighboring the terminal using an SHF/EHF band and information associated with the terminal.

The first list may be updated periodically.

The scheduling unit may allocate the radio resources separately for a control channel and a traffic channel.

The path finding unit may change to another path in real time to ensure a line of sight (LoS) when the selected path is blocked.

The path finding unit may switch to a cellular frequency band when the path is absent.

According to another aspect of the present invention, there is provided an SHF/EHF band wireless terminal including a list making unit to make a list associated with an SHF/EHF band signal on a wireless network, and a path managing unit to receive and combine at least one path being selected based on the first list.

The first list may include at least one piece of information among information associated with a base station neighboring the terminal using an SHF/EHF band and information associated with the terminal, and the list making unit may update the first list by searching for a pilot from the base station neighboring the terminal periodically.

According to still another aspect of the present invention, there is provided a method for SHF/EHF band wireless transmission on a multi-level configuration in a wireless network comprising a first network performing a central role and a second network performing at least one task of configuring, maintaining, and unconfiguring a network autonomously, the method including receiving and managing a first list associated with an SHF/EHF band signal from a terminal connected to the wireless network, selecting a path having a communication quality value greater than or equal to a first threshold value by referring to the first list, and scheduling available radio resources for the selected path.

The first list may include at least one piece of information among information associated with a base station neighboring the terminal using an SHF/EHF band and information associated with the terminal, and is updated periodically.

The selecting of the path may include changing to another path in real time to ensure an LoS when the selected path is blocked.

The selecting of the path may include switching to a cellular frequency band when the path is absent.

According to yet another aspect of the present invention, there is provided a method for SHF/EHF band wireless transmission on a multi-level configuration, the method including receiving and managing a first list associated with an SHF/EHF band signal from a terminal connected to a wireless network, selecting a path having a communication quality value greater than or equal to a first threshold value by referring to the first list, and scheduling, for the selected path, radio resources to use a cellular band for a control channel and to use an SHF/EHF band for a traffic channel.

According to a further another aspect of the present invention, there is provided a method for SHF/EHF band wireless transmission on a multi-level configuration, the method including receiving and managing a first list associated with an SHF/EHF band signal from a terminal connected to a wireless network, selecting a path having a communication quality value greater than or equal to a first threshold value by referring to the first list, and scheduling and allocating, for the selected path, available SHF/EHF band radio resources separately for a control channel and a traffic channel.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein.

The term "first network" as used herein refers to a core network performing a central role in a mobile communication network, and may correspond to, for example, a cellular system.

The term "second network" as used herein refers to an autonomous network performing the tasks of configuring, maintaining, and unconfiguring a network autonomously with the restricted support of the core network, and may correspond to, for example, a device-to-device (D2D), Internet of Things (IoT), and the like.

The term "first list" as used herein refers to a list including at least one piece of information among information associated with a terminal connected to a wireless network and information associated with a base station neighboring the terminal using a super high frequency (SHF)/extremely high frequency (EHF) band signal, and may be used for path finding for establishing a line of sight (LoS) communication path subject to make use of SHF/EHF bands and radio resource scheduling.

The term "first threshold value" as used herein refers to a reference value for a communication quality of at least one communication path included in the first list, and may be used to select an appropriate communication path.

Figure 1:
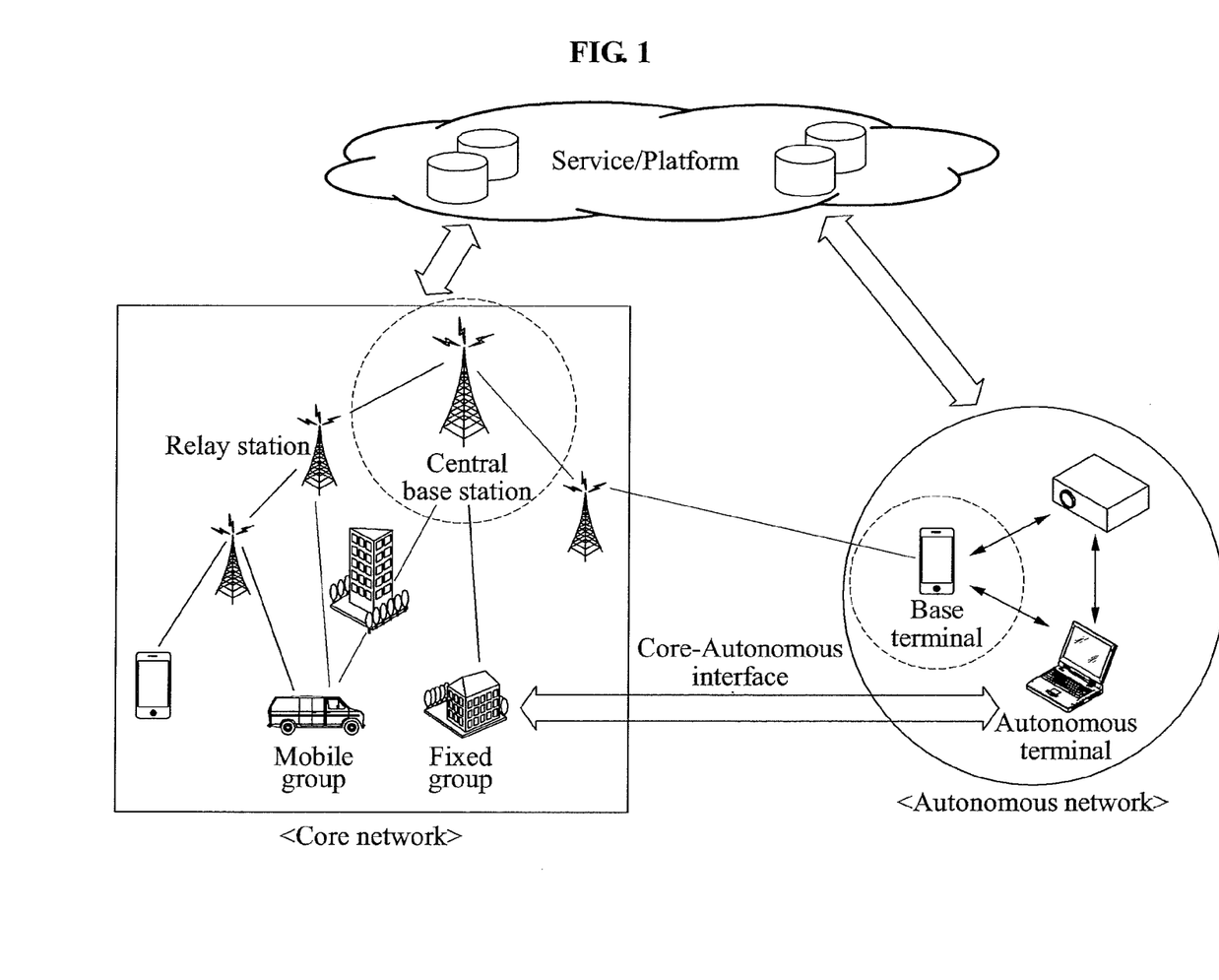
FIG. 1 is a conceptual diagram illustrating a wireless communication system using cellular frequency bands and super high frequency (SHF)/extremely high frequency (EHF) bands concurrently according to an exemplary embodiment.

FIG. 1 is a conceptual diagram illustrating a wireless communication system using cellular frequency bands and SHF/EHF bands concurrently according to an exemplary embodiment.

The wireless communication system may include a network performing a central role in a mobile communication network, called a core network, for example, a cellular system, and a network performing the tasks of configuring, maintaining, and unconfiguring a network with the restricted support of the core network, called an autonomous network, for example, a device-to-device (D2D), Internet of Things (IoT), and the like.

The core network may include a central base station corresponding to a general parent base station, a mobile station including smart devices, and a relay station that relays data using a radio link between the mobile station and the central base station.

The autonomous network may include a base terminal connected to the central base station and acting as both a base station and a terminal, and an autonomous terminal including smart devices, machines, sensors, and the like.

In the autonomous network, a radio link between autonomous stations as well as a radio link between a base terminal and an autonomous terminal may be used as a communication link.

The relay station of the core network and the base terminal of the autonomous network may be connected via the same radio link as an interface between the relay station and the mobile station in the core network.

When the autonomous terminal of the autonomous network includes a function of the core network, seamless switching from the core network to the autonomous network or from the autonomous network to the core network may be achieved through a core-autonomous interface.

The wireless network service/platform of FIG. 1 may provide various types of applications and contents to the core network and the autonomous network.

The autonomous terminal of the autonomous network may conduct a direct communication through the radio interface between autonomous terminals.

Also, data collected from each autonomous terminal may be transmitted to and accumulated in a corresponding server over the core network using the wireless network service/platform, and in turn, accumulated knowledge may be provided to each autonomous terminal of the autonomous network, and this process may be the framework for a cycle.

Figure 2:
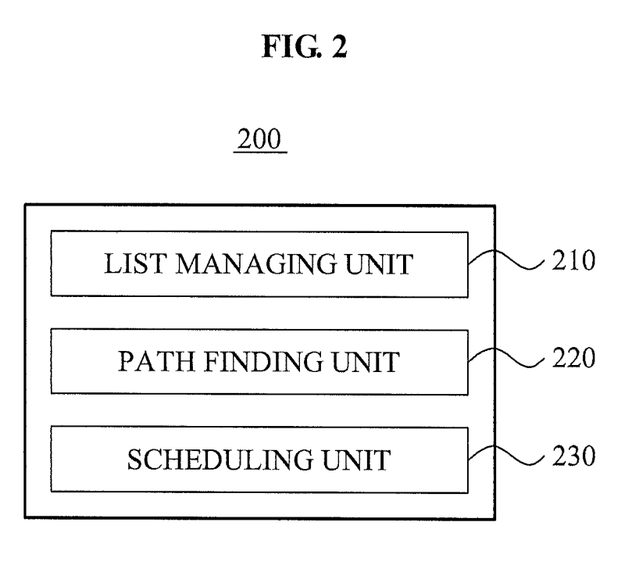
FIG. 2 is a block diagram illustrating a structure of an apparatus for SHF/EHF band wireless transmission on a multi-level cell configuration according to an exemplary embodiment.

FIG. 2 is a block diagram illustrating a structure of an apparatus 200 for SHF/EHF band wireless transmission on a multi-level cell configuration according to an exemplary embodiment.

The apparatus 200 for SHF/EHF band wireless transmission on the multi-level cell configuration may configure a multi-level relay station topology to establish at least one beam path at a location of each terminal, based on an overlapping topology feature using a multi-level relaying scheme between a terminal and a base station in an SHF/EHF band network, through which a communication environment between the terminal and the base station may be created.

The apparatus 200 for SHF/EHF band wireless transmission on the multi-level cell configuration may include a list managing unit 210, a path finding unit 220, and a scheduling unit 230.

The list managing unit 210 may receive and manage a first list associated with an SHF/EHF band signal from a terminal connected to a wireless network.

The wireless network may include a first network performing a central role, and a second network performing at least one task of configuring, maintaining, and unconfiguring a network with the restricted support of the first network.

The first list may include at least one piece of information among information associated with a base station neighboring the terminal connected to the wireless network using SHF/EHF bands, and information associated with the terminal.

Also, the first list may be updated periodically to establish an LoS communication path subject to use of the SHF/EHF bands.

The path finding unit 220 may select a path having a communication quality value greater than or equal to a first threshold value by referring to the first list.

The first threshold value may correspond to a reference value for a communication quality of at least one communication path included in the first list, and may be used to select a communication path.

The path finding unit 220 may switch to another path in real time based on the first list when the selected path is blocked, to ensure an LoS.

However, when the path having the communication quality value greater than or equal to the first threshold value is absent, the path finding unit 220 may switch from the SHF/EHF bands to cellular frequency bands.

The scheduling unit 230 may schedule and allocate available SHF/EHF band radio resources for the selected path.

Figure 5:
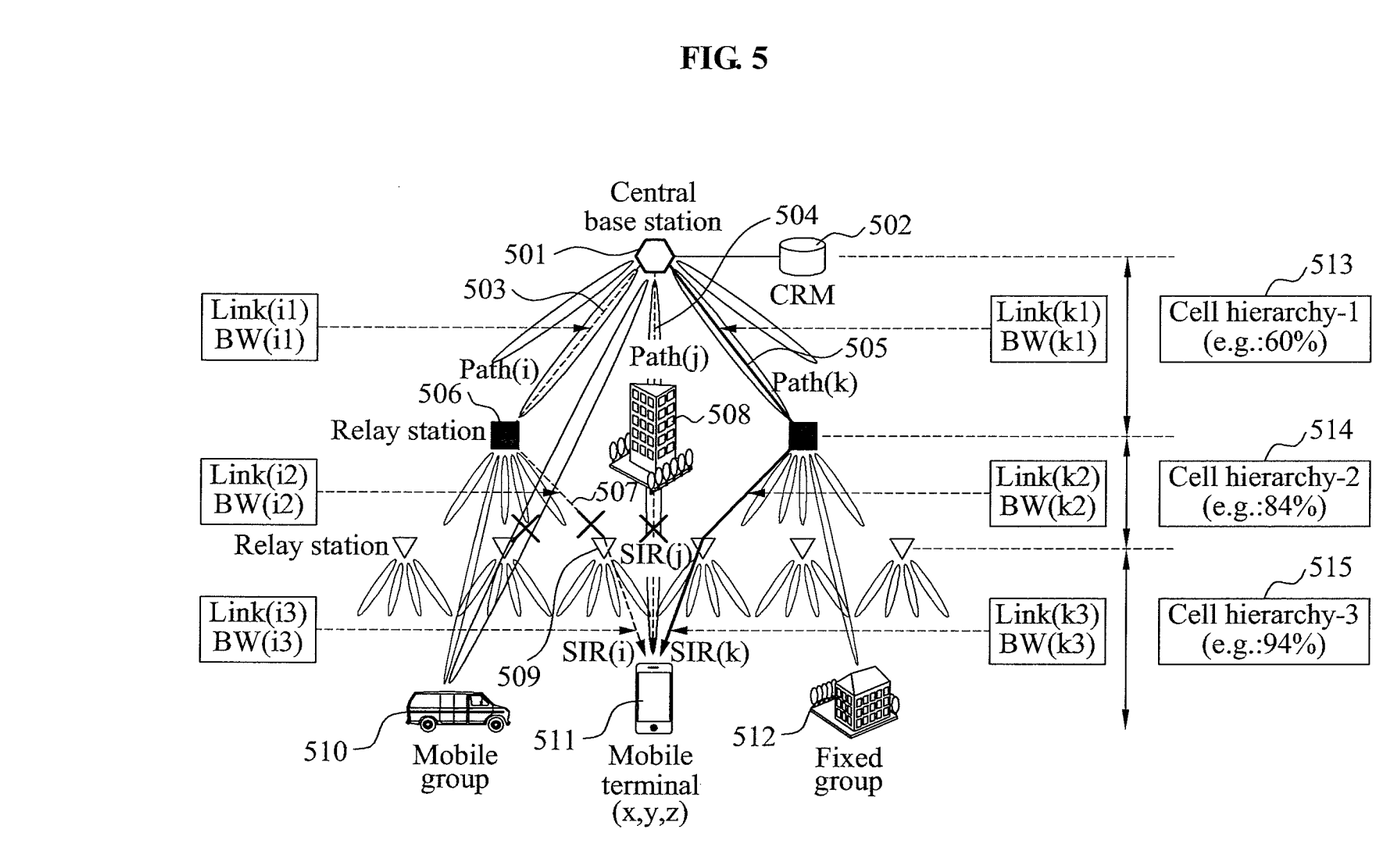
FIG. 5 is a diagram illustrating an N-level configuration for establishing at least one communication path to enable communications between a central base station and relay stations in a core network wireless communication environment using SHF/EHF bands according to an exemplary embodiment.

A detailed description of finding the LoS communication path subject to the use of the SHF/EHF bands is provided with reference to FIG. 5.

The scheduling unit 230 may allocate the radio resources separately for a control channel and a traffic channel.

In this case, cellular frequency bands and SHF/EHF bands may be used concurrently, and basically, stable cellular frequency bands without requiring LoS establishment may be allocated for a control channel and SHF/EHF frequency bands requiring LoS establishment may be allocated for a rapid traffic channel, such that a maximum wireless transfer rate and a service quality desired by subscribers may be provided in a multi-level relay environment with an LoS.

Table 1 shows a resource allocation scheme for a control channel and a traffic channel in use between a terminal and a base station in a wireless network environment using cellular bands and SHF/EHF bands concurrently.

TABLE 1

|  | Control | |
| --- | --- | --- |
| Traffic | Cellular Band | SHF/EHF Band |
| Cellular Band | Typical cellular mode | Ineffective (not available) |
| SHF/EHF Band | Initial mode | Mature mode |

Since the terminal operates in a multi-band/mode, the terminal may set cellular bands or SHF/EHF bands to be an active mode based on a propagation environment including an LoS or a quality of service (QoS) during an initial communication attempt, as shown in Table 1.

Referring to Table 1, an initial mode and a mature mode may be set to use different frequency bands in use for initial call setting and subsequent traffic allocation.

In the initial mode, cellular bands may be used for initial call setting and SHF/EHF bands may be allocated for subsequent traffic allocation, or cellular bands may be allocated for initial call setting and a low-rate light traffic and supplemental SHF/EHF bands may be allocated for a high-rate associated with heavy user traffic.

According to an exemplary embodiment, the initial mode may be determined based on a multi-path finder by a common resource manager (CRM) of the central base station of the core network with the help of the terminal.

In the mature mode, SHF/EHF bands may be allocated for initial call setting and subsequent traffic rates of all types.

The apparatus 200 for SHF/EHF band wireless transmission on the multi-level cell configuration may be applied partially to a new next-generation mobile communication system as a successor of a cellular system and a fourth-generation mobile communication system, for example, a high speed packet access (HSPA) system developed by a 3rd generation partnership project (3GPP), and long term evolution (LTE), LTE-Advanced (LTE-A), and the institute of electrical and electronics engineers (IEEE) mobile worldwide interoperability for microwave access (WiMAX) systems.

Figure 3:
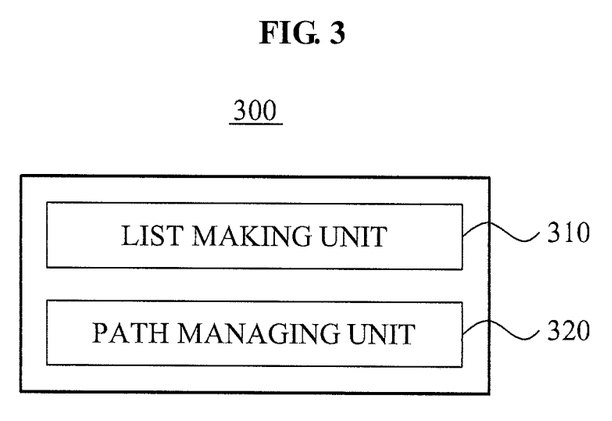
FIG. 3 is a block diagram illustrating a structure of an SHF/EHF band wireless terminal according to an exemplary embodiment.

FIG. 3 is a block diagram illustrating a structure of an SHF/EHF band wireless terminal 300 according to an exemplary embodiment.

The SHF/EHF band wireless terminal 300 may include a list making unit 310 and a path managing unit 320.

The list making unit 310 may make a list associated with an SHF/EHF band signal on a wireless network.

The first list may include at least one piece of information among information associated with a base station neighboring the terminal using SHF/EHF bands and information associated with the terminal.

Also, the list making unit 310 may update the first list in real time by searching for a pilot from the base station neighboring the terminal periodically.

The path managing unit 320 may receive and combine at least one path being selected based on the first list.

Figure 4:
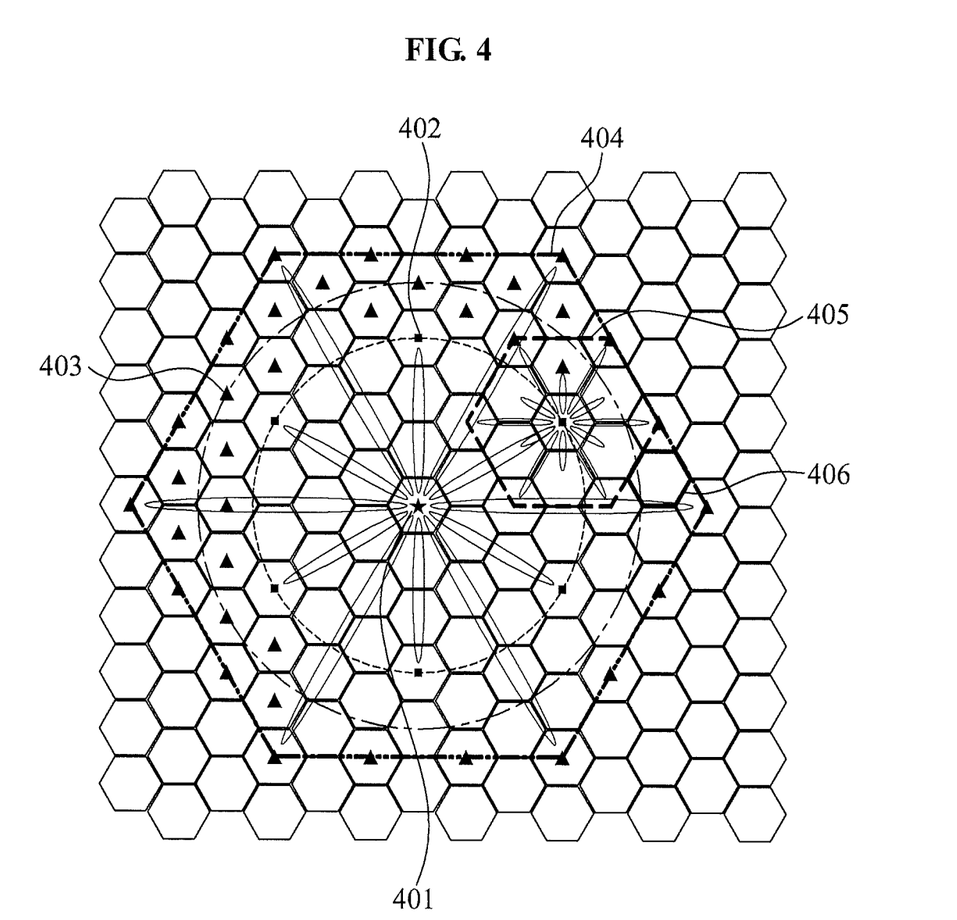
FIG. 4 is a diagram illustrating a multi-level cell configuration with physically overlapping coverage of a central base station and relay stations in a core network wireless communication environment using SHF/EHF bands according to an exemplary embodiment.

FIG. 4 is a diagram illustrating a multi-level cell configuration with physically overlapping coverage of a central base station and relay stations in a core network wireless communication environment using SHF/EHF bands according to an exemplary embodiment.

Beamforming from a central base station 401 may cover a cell of a first cell hierarchy 404, beamforming from a relay station 402 may cover a cell of a second cell hierarchy 405, and beamforming from a relay station 403 may cover a cell of a third cell hierarchy 406.

Accordingly, a mobile terminal, a mobile group object, or a fixed group object may enable multi-beamforming with the central base station 401, the first relay station 402, and the second relay station 403 based on a location of each of the mobile terminal, the mobile group object, and the fixed group object. In FIG. 4, concurrent connections to base stations may be achieved through a maximum of three beams.

For each cell hierarchy of FIG. 4, a corresponding coverage may be reduced or expanded dynamically based on a communication environment such as, for example, a state of a terminal within a cell, and when needed, operations of each cell may be limited to reduce power consumption.

FIG. 5 is a diagram illustrating an N-level configuration for establishing at least one communication path to enable communications between a central base station and relay stations in a core network wireless communication environment using SHF/EHF bands according to an exemplary embodiment.

Topology-based communication path finding of FIG. 5 may be performed by the following three steps.

In a first step, to establish multiple paths, a mobile terminal 511 may receive all pilot signals of SHF/EHF bands from neighboring base stations, for example, a central base station 501 or a relay station 509, may measure the received signals, and may provide a report about a measurement list of the received pilot signals (SIR(path(i)), i=1~n, n: a number of the received pilot signals of the SHF/EHF bands) to a CRM 502 of the corresponding central base station 501, along with identification (ID) information of the mobile terminal 511.

Subsequently, in a second step, the CRM 502 may select paths having a communication quality SIR(i) greater than or equal to a predetermined threshold value, generally under the assumption of a maximum of y best paths, and may schedule and allocate available SHF/EHF band radio resources for the selected communication paths.

The making of the measurement list of the received pilot signals and the selecting of the paths having the communication quality greater than equal to the predetermined threshold value may be performed by referring to Equations 1 and 2.

$$\text{Best paths}=\max[\Sigma SIR(\text{path}(i)), i=1\sim n]  \quad [\text{Equation 1}]$$

$$SIR(\text{path}(i))=\min[\Sigma SIR(\text{path}(i,j)), j=1\sim w]  \quad [\text{Equation 2}]$$

In Equation 1, n denotes a number of paths supporting an LoS, and in Equation 2, w denotes a number of links constituting the path(i).

Here, SIR(path(i)) denotes an SIR of a link having a minimum SIR value among the links constituting the path(i), and a number of paths needed for communication may be generally limited to three (3-best paths) or less.

The radio resource allocation for the selected communication paths or best paths may be determined based on a desired service quality, for example, a QoS or a quality of experience (QoE), and costs incurred in configuring all paths of radio links between an intended terminal and a central base station, and in this regard, the CRM may have a related additional function.

A carrier frequency and a bandwidth of the radio resources in use for each link may be changed in real time based on a propagation environment and a service quality change, by applying a concept of a cognitive radio system (CRS).

The CRM terminal may be informed of location information (x, y, z) of the terminal in real time to enable the terminal to conduct an easier search for a neighboring base station.

In a third step, when the communication paths between the mobile terminal 511 and the central base station 501 are determined, the mobile terminal may combine the selected paths or best paths to reinforce the received signals or a receiving environment with the goal of seamless mobility.

In this instance, the terminal and the base station may operate to avoid causing a disconnection of communication between the terminal and the base station even in an exceptional situation.

The terminal may change to another communication path in real time even though the established LoS communication path is blocked due to an instantaneous radio wave obstruction, by searching for pilot signals from a neighboring base station periodically during communication, by providing a report about a measurement list of the received pilot signals to the CRM 502 of the corresponding central base station 501, and by updating the corresponding list in real time.

The terminal may support a multi-band/mode, and may search for a neighboring base station based on discontinuous reception (DRX) or a radio resource scheduling scheme.

However, in a case in which no communication path exists between the terminal and the base station, the frequency band may be switched from the SHF/EHF bands to cellular frequency bands.

A detailed procedure of wireless communication call setting in an SHF/EHF band environment may follow general cellular communications, for example, 3GPP LTE-Advanced and the like.

Similarly, the same may be applied to an uplink for transmission from the terminal to the base station.

Figure 6:
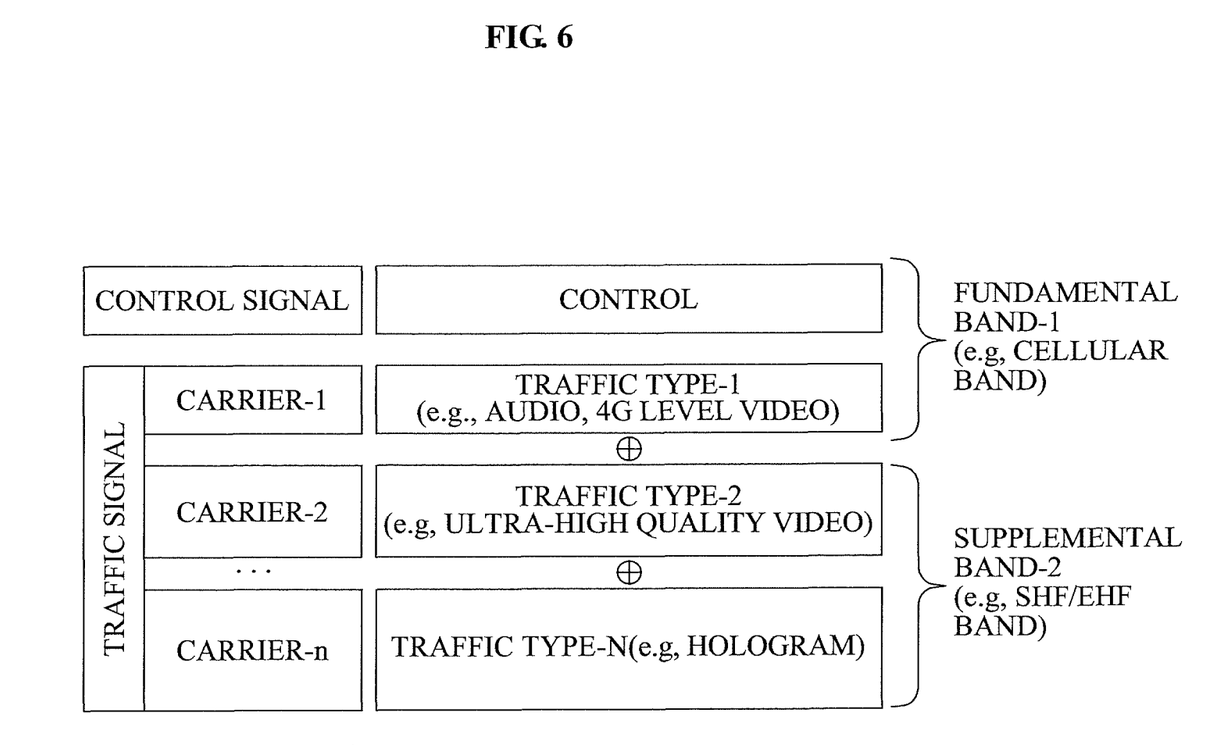
FIG. 6 is a diagram illustrating radio resource allocation for control and traffic channels according to an exemplary embodiment.

FIG. 6 is a diagram illustrating radio resource allocation for control and traffic channels according to an exemplary embodiment.

Referring to FIG. 6, a resource allocation algorithm may be executed, in which control information associated with system control and call setting may use cellular bands, and traffic information associated with ultra high-quality video transmission may use cellular band and SHE/EHF band concurrently.

Aside from a control signal, the resource allocation algorithm may be executed, in which cellular bands may be used for traffic requiring low radio resource consumption; and SHF/EHF bands may be used for traffic requiring high radio resource consumption.

That is, asymmetric carrier aggregation may be used, allowing allocation of cellular bands for a light traffic such as, for example, initial call setting attempt or voice or standard-definition video, and allocation of supplemental SHF/EHF bands for a heavy user traffic.

A detailed procedure of call setting for SHF/EHF band resource use may follow general cellular communications, for example, 3 GPP LTE-Advanced and the like.

Figure 7:
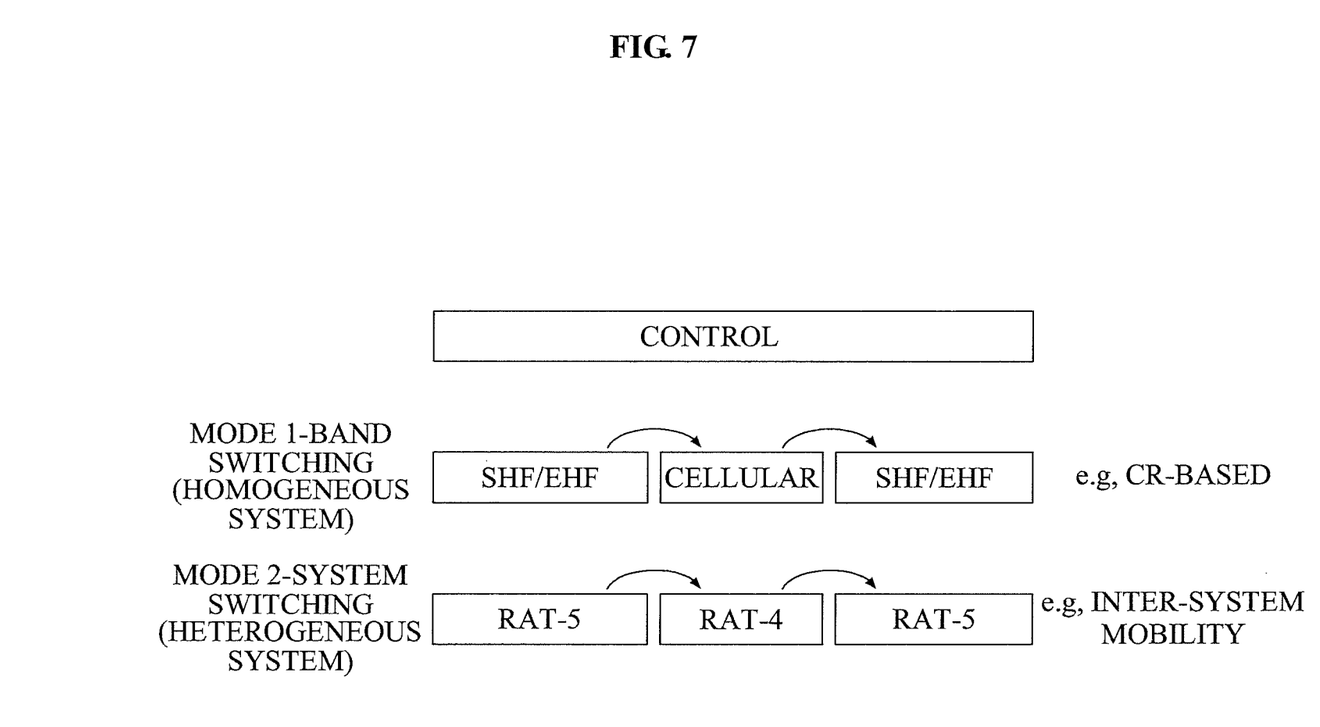
FIG. 7 is a diagram illustrating an operation for each traffic resource in a case in which cellular bands and SHF/EHF bands are used concurrently according to an exemplary embodiment.

FIG. 7 is a diagram illustrating an operation for each traffic resource in a case in which cellular bands and SHF/EHF bands are used concurrently according to an exemplary embodiment.

As shown in FIG. 7, when cellular bands and SHF/EHF bands are used commonly, a mode 1 and a mode 2 may work.

The mode 1 may work on a homogeneous system irrespective of frequency bands, and may switch between different frequency bands in cellular bands or SHF/EHF bands based on a propagation environment including an LoS environment or a service quality, for example, a QoS, a QoE, and the like.

The mode 2 may work on a heterogeneous system using different frequency bands, for example, an LTE system or a system using SHF/EHF bands, and may switch between different radio access technologies (RATs) based on a propagation environment including an LoS environment or a service quality, for example, a QoS, a QoE, and the like.

Figure 8:
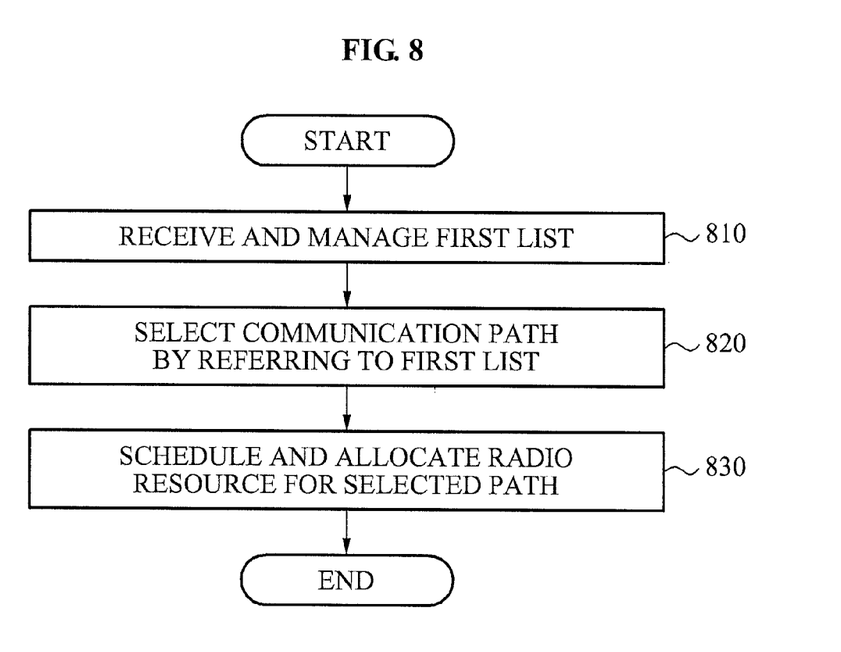
FIG. 8 is a flowchart illustrating a method for SHF/EHF band wireless transmission on a multi-level cell configuration according to an exemplary embodiment.

FIG. 8 is a flowchart illustrating a method for SHF/EHF band wireless transmission on a multi-level cell configuration according to an exemplary embodiment.

In the method for SHF/EHF band wireless transmission on the multi-level cell configuration in a wireless network, the wireless network may include a first network and a second network, wherein the first network may perform a central role, and the second network may perform at least one task of configuring, maintaining, and unconfiguring a network autonomously with the restricted support of the first network.

In operation 810, the list managing unit 210 may receive and manage a first list associated with an SHF/EHF band signal from a terminal connected to the wireless network.

The first list may include at least one piece of information among information associated with a base station neighboring the terminal connected to the wireless network using an SHF/EHF band signal, and information associated with the terminal.

Also, the first list may be updated periodically to establish an LoS communication path subject to the use of the SHF/EHF bands.

In operation 820, the path finding unit 220 may select a path having a communication quality value greater than or equal to a first threshold value by referring to the first list.

The first threshold value may correspond to a reference value for a communication quality of at least one communication path included in the first list, and may be used to select a communication path.

In operation 820, when the selected path is blocked, the path finding unit 220 may switch to another path in real time based on the first list, to ensure an LoS.

However, the path finding unit 220 may switch the SHF/EHF bands to cellular frequency bands when the path having the communication quality value greater than or equal to the first threshold value is absent.

In operation 830, the scheduling unit 230 may schedule available SHF/EHF band radio resources for the selected path.

The scheduling unit 230 may allocate the radio resources separately for a control channel and a traffic channel.

In this case, the radio resources may be allocated in such a manner that a control channel may use cellular bands and a traffic channel may use SHF/EHF bands, or a control channel or a low-rate light traffic may use cellular bands, and SHF/EHF bands may be only allocated for a high-rate associated with heavy traffic.

According to another exemplary embodiment, the method for SHF/EHF band wireless transmission on the multi-level cell configuration may be provided such that a control channel such as, for example, initial call setting may use cellular bands and SHF/EHF bands may be allocated for subsequent traffic.

In this case, the list managing unit 210 may receive and manage a first list associated with an SHF/EHF band signal from a terminal connected to a wireless network.

Also, the path finding unit 220 may select a path having a communication quality value greater than or equal to a first threshold value by referring to the first list.

For the selected path, the scheduling unit 230 may schedule radio resources to use cellular bands for a control channel and to use SHF/EHF band for a traffic channel.

According to still another exemplary embodiment, the method for SHF/EHF band wireless transmission on the multi-level cell configuration may be provided such that SHF/EHF bands may be allocated for a control channel and subsequent traffics of all types.

In this case, the list managing unit 210 may receive and manage a first list associated with an SHF/EHF band signal from a terminal connected to a wireless network.

Also, the path finding unit 220 may select a path having a communication quality value greater than or equal to a first threshold value by referring to the first list.

The scheduling unit 230 may schedule, for the selected path, available SHF/EHF band radio resources separately for a control channel and a traffic channel.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for super high frequency (SHF)/extremely high frequency (EHF) band wireless transmission on a multi-level configuration, the apparatus comprising:
  a list managing unit to receive and manage a first list associated with an SHF/EHF band signal from a terminal connected to a wireless network;
  a path finding unit to select a path having a communication quality value greater than or equal to a first threshold value by referring to the first list; and
  a scheduling unit to schedule available SHF/EHF band radio resources for the selected path,
  wherein the scheduling unit allocates the radio resources separately for a control channel and a traffic channel based on an initial mode or a mature mode,
  wherein the initial mode uses cellular bands for an initial call setting, and uses SHF/EHF bands for subsequent traffic allocation, and wherein the mature mode uses SHF/EHF bands for an initial call setting and subsequent traffic rates of all types.

2. The apparatus of claim 1, wherein the wireless network comprises:
a first network performing a central role; and
a second network performing at least one task of configuring, maintaining, and unconfiguring a network with the restricted support of the first network.

3. The apparatus of claim 1, wherein the first list comprises at least one piece of information among information associated with a base station neighboring the terminal using an SHF/EHF band and information associated with the terminal.

4. The apparatus of claim 3, wherein the first list is updated periodically.

5. The apparatus of claim 1, wherein the path finding unit changes to another path in real time to ensure a line of sight (LoS) when the selected path is blocked.

6. The apparatus of claim 5, wherein the path finding unit switches to a cellular frequency band when the path is absent.

7. A super high frequency (SHF)/extremely high frequency (EHF) band wireless terminal, comprising:
a list making unit to make a list associated with an SHF/EHF band signal on a wireless network; and
a path managing unit to receive and combine at least one path being selected based on the first list,
wherein the path managing unit switches a frequency band from the SHF/EHF bands to cellular bands when the path is absent,
wherein available SHF/EHF band radio resources are allocated for the selected at least one path and the available SHF/EHF radio resources are allocated separately for a control channel and a traffic channel based on an initial mode or a mature mode,
wherein the initial mode uses cellular bands for an initial call setting, and uses SHF/EHF bands for subsequent traffic allocation, and
wherein the mature mode uses SHF/EHF bands for an initial call setting and subsequent traffic rates of all types.

8. The SHF/EHF band wireless terminal of claim 7, wherein the first list comprises at least one piece of information among information associated with a base station neighboring the terminal using an SHF/EHF band and information associated with the terminal, and
the list making unit updates the first list by searching for a pilot from the base station neighboring the terminal periodically.

9. A method for super high frequency (SHF)/extremely high frequency (EHF) band wireless transmission on a multi-level configuration in a wireless network comprising a first network performing a central role and a second network performing at least one task of configuring, maintaining, and unconfiguring a network autonomously, the method comprising:
receiving and managing a first list associated with an SHF/EHF band signal from a terminal connected to the wireless network;
selecting a path having a communication quality value greater than or equal to a first threshold value by referring to the first list; and
scheduling available radio resources for the selected path, based on an initial mode or a mature mode,
wherein the initial mode uses cellular bands for an initial call setting, and uses SHF/EHF bands for subsequent traffic allocation, and
wherein the mature mode uses SHF/EHF bands for an initial call setting and subsequent traffic rates of all types.

10. The method of claim 9, wherein the first list comprises at least one piece of information among information associated with a base station neighboring the terminal using an SHF/EHF band and information associated with the terminal, and is updated periodically.

11. The method of claim 9, wherein the selecting of the path comprises changing to another path in real time to ensure a line of sight (LoS) when the selected path is blocked.

12. The method of claim 11, wherein the selecting of the path comprises switching to a cellular frequency band when the path is absent.

13. A method for super high frequency (SHF)/extremely high frequency (EHF) band wireless transmission on a multi-level configuration, the method comprising:
receiving and managing a first list associated with an SHF/EHF band signal from a terminal connected to a wireless network;
selecting a path having a communication quality value greater than or equal to a first threshold value by referring to the first list; and
scheduling, for the selected path, radio resources to use a cellular band for a control channel and to use an SHF/EHF band for a traffic channel, based on an initial mode or a mature mode,
wherein the initial mode uses cellular bands for an initial call setting, and uses SHF/EHF bands for subsequent traffic allocation, and
wherein the mature mode uses SHF/EHF bands for an initial call setting and subsequent traffic rates of all types.

14. A method for super high frequency (SHF)/extremely high frequency (EHF) band wireless transmission on a multi-level configuration, the method comprising:
receiving and managing a first list associated with an SHF/EHF band signal from a terminal connected to a wireless network;
selecting a path having a communication quality value greater than or equal to a first threshold value by referring to the first list; and
scheduling and allocating, for the selected path, available SHF/EHF band radio resources separately for a control channel and a traffic channel, based on an initial mode or a mature mode,
wherein the initial mode uses cellular bands for an initial call setting, and uses SHF/EHF bands for subsequent traffic allocation, and
wherein the mature mode uses SHF/EHF bands for an initial call setting and subsequent traffic rates of all types.

* * * * *